(12) United States Patent
Triandopoulos et al.

(10) Patent No.: US 9,350,545 B1
(45) Date of Patent: May 24, 2016

(54) RECOVERY MECHANISM FOR FAULT-TOLERANT SPLIT-SERVER PASSCODE VERIFICATION OF ONE-TIME AUTHENTICATION TOKENS

(71) Applicant: EMC Corporation, Hopkinton, MA (US)

(72) Inventors: Nikolaos Triandopoulos, Arlington, MA (US); John Brainard, Sudbury, MA (US)

(73) Assignee: EMC Corporation, Hopkinton, MA (US)

( * ) Notice: Subject to any disclaimer, the term of this patent is extended or adjusted under 35 U.S.C. 154(b) by 131 days.

(21) Appl. No.: 14/319,417

(22) Filed: Jun. 30, 2014

(51) Int. Cl.
*H04L 9/32* (2006.01)
*H04L 29/06* (2006.01)
*H04L 9/08* (2006.01)

(52) U.S. Cl.
CPC ............... *H04L 9/321* (2013.01); *H04L 9/085* (2013.01); *H04L 9/3213* (2013.01); *H04L 9/3226* (2013.01); *H04L 63/083* (2013.01); *H04L 63/0838* (2013.01); *H04L 63/0846* (2013.01)

(58) Field of Classification Search
CPC ....... H04L 9/085; H04L 9/321; H04L 9/3213; H04L 9/3226; H04L 63/083; H04L 63/0838; H04L 63/0846
See application file for complete search history.

(56) References Cited

U.S. PATENT DOCUMENTS

| | | | | |
|---|---|---|---|---|
| 6,959,394 B1* | 10/2005 | Brickell | ............... | G06Q 20/206 380/44 |
| 7,139,917 B2* | 11/2006 | Jablon | .................. | H04L 9/0844 713/183 |
| 8,245,050 B1* | 8/2012 | Subramanian | ...... | H04L 63/0428 380/277 |
| 9,037,858 B1* | 5/2015 | Juels | ..................... | H04L 9/3226 713/168 |
| 9,203,616 B1* | 12/2015 | Brown | .................. | H04L 9/3273 |
| 9,215,072 B1* | 12/2015 | Barton | .................. | H04L 9/3226 |
| 2004/0030932 A1* | 2/2004 | Juels | ..................... | H04L 63/083 713/151 |
| 2007/0044143 A1* | 2/2007 | Zhu | ......................... | G06F 21/33 726/8 |
| 2010/0131755 A1* | 5/2010 | Zhu | ..................... | H04L 63/0815 713/155 |
| 2015/0242616 A1* | 8/2015 | Oprea | .................. | G06F 21/445 726/1 |
| 2015/0341335 A1* | 11/2015 | Camenisch | ............. | G06F 21/31 713/156 |
| 2015/0349958 A1* | 12/2015 | Lindell | .................. | H04L 9/085 713/168 |

* cited by examiner

*Primary Examiner* — Jason K. Gee
*Assistant Examiner* — Zhimei Zhu
(74) *Attorney, Agent, or Firm* — Ryan, Mason & Lewis, LLP

(57) ABSTRACT

A recovery mechanism is provided for split-server passcode verification systems. An exemplary server-centric recovery scheme enables the system to respond to authentication attempts even if an authentication server is unavailable. The exemplary server-centric recovery scheme allows a periodic exchange of encrypted partial secret states among the authentication servers. Recovery occurs by allowing the decryption of the encrypted partial secret state that corresponds to the server that is unresponsive. An exemplary token-centric recovery scheme comprises determining that a first authentication server is unavailable; applying an authentication mechanism to a message requesting a token to change to a new split-state mode; and sending the authenticated message to the token.

16 Claims, 3 Drawing Sheets

RECOVERY MECHANISM FOR FAULT-TOLERANT SPLIT-SERVER PASSCODE VERIFICATION OF ONE-TIME AUTHENTICATION TOKENS

FIELD

The field relates generally to authentication, and more particularly to recovery schemes in multi-server authentication systems.

BACKGROUND

One-time authentication tokens produce unpredictable one-time passcodes (OTP) typically by extracting pseudorandomness from a secret seed, that is stored at the token and shared with the authentication server. To protect against server-side leakage of the underlying seed, tokens may employ split-server verification protocols (see, e.g., U.S. Pat. No. 7,725,730). In a split-server verification protocol, the underlying authentication secret is split into at least two partial secrets, each one kept by a distinct verification server, so that authentication of a user is performed at these servers in a distributed manner so that certain attacks against one or more servers can be tolerated.

A number of such split-server OTP verification protocols have been proposed. See, for example, U.S. patent application Ser. No. 13/404,737, entitled "Method and Apparatus for Authenticating a User Using Multi-Server One-Time Passcode Verification," (now U.S. Pat. No. 9,118,661); U.S. patent application Ser. No. 13/795,801, entitled "Distributed Cryptography Using Distinct Value Sets Each Comprising At Least One Obscured Secret Value;" and U.S. patent application Ser. No. 14/144,707, entitled "Multi-Server One-Time Passcode Verification of Respective High Order and Low Order Passcode Portions."

While such split-server solutions have successfully addressed the security problems related to possible server-side compromises and secret leakage, at the same time they introduce a new issue due to possible benign failures or unavailability of one or more of the verification servers. For example, in a two-server architecture, if one of the two servers becomes unavailable, e.g., due to internal software or hardware failures or due to networking problems, then the system immediately becomes unable to handle incoming split-server authentication attempts by users. The correct passcode cannot be reconstructed as one of the passcode components is not retrievable.

Replication-based server-recovery solutions can be employed to mitigate this problem in the split-server setting, but they tend to be costly, as they increase operational and maintenance costs as well as the storage needs of the entire system. In addition, such replication-based server-recovery solutions also replicate the secret states of the system, thus negatively affecting the security of the system since they offer a wider attack vector to the adversary. An attacker now has more options as to which servers to select for an attack. Indeed, the attacker may choose to attack a replica server that can potentially be an easier target.

Thus, a need exists for efficient recovery schemes for split-server OTP verification systems that do not rely on replication (if needed, such schemes can be actually complementary to standard replication-based solutions). A further need exists for a recovery mechanism for split-server OTP verification systems that allows the system to operate smoothly and unaffectedly even in the event of a server going temporarily or permanently down.

SUMMARY

Illustrative embodiments of the present invention provide a recovery mechanism for split-server passcode verification systems. According to one aspect of the invention, an exemplary recovery method for a split-server passcode verification system comprising a plurality of authentication servers comprises the steps of: determining that a first one of the plurality of authentication servers is unavailable; instructing a second one of the plurality of authentication servers to enter a recovery mode, wherein prior to the first authentication server becoming unavailable, at least one of the first and second authentication servers provide a respective secret key used to protect a partial secret state $\sigma_t$ to a relying party and the second authentication server receives an encrypted version $c_t$ of the respective partial secret state $\sigma_t$ of the first authentication server; obtaining the encrypted partial secret state $c_t$ of the first authentication server from the second authentication server; decrypting the received encrypted partial secret state $c_t$ of the first authentication server to recover the partial secret state $\sigma_t$ of the first authentication server; and employing the recovered partial secret state $\sigma_t$ of the first authentication server to perform a split-server passcode verification of at least one user with the second authentication server.

In one exemplary embodiment, the first and second authentication servers exchange an encrypted version $c_t$ of the respective partial secret state $\sigma_t$. In another exemplary embodiment, the replying party generates secret keys $sk_{B,t}$, $sk_{R,t}$ for the first and second authentication servers, respectively; obtains a respective partial secret state $\sigma_{B,t}$, $\sigma_{R,t}$ from the first and second authentication servers, respectively; encrypts the respective partial secret states $\sigma_{B,t}$, $\sigma_{R,t}$ using at least one encryption key; and provides each of the encrypted versions $c_{B,t}$, $c_{R,t}$ of the respective partial secret state $\sigma_{B,t}$, $\sigma_{R,t}$ to the other of the authentication servers.

According to another aspect of the invention, an exemplary recovery method for a split-server passcode verification system comprising at least one token and a plurality of authentication servers, comprises the steps of: determining that a first one of the plurality of authentication servers is unavailable; applying an authentication mechanism to a message requesting the token to change to a new split-state mode; and sending the authenticated message to the token.

In one exemplary embodiment, the authentication mechanism comprises a relying party signing the message using a next passcode of the new split-state mode. The new split-state mode comprises a single server passcode verification and wherein the next passcode of the new split-state mode comprises a next passcode of the single server. A client optionally changes to the new split-state mode only after successfully verifying the authentication mechanism.

Embodiments of the invention can be implemented in a wide variety of different authentication applications where split-server verification of one-time passcodes (OTPs) is employed.

DETAILED DESCRIPTION

Figure 1:
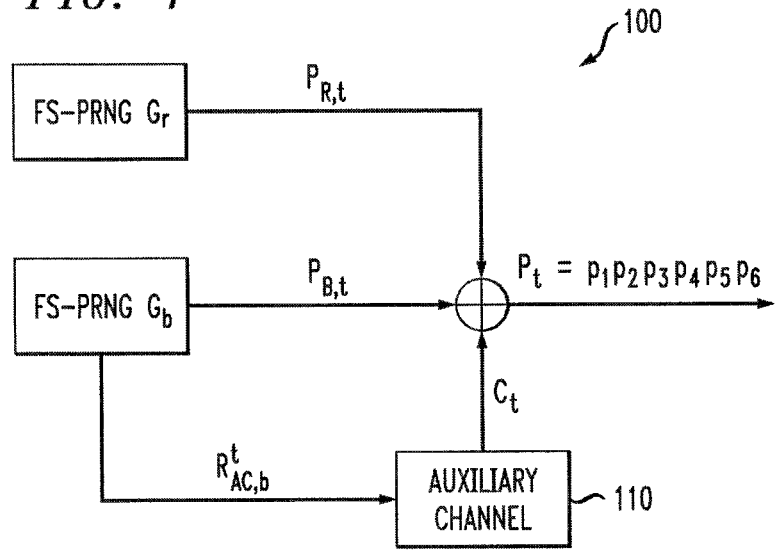
FIG. 1 illustrates an exemplary client-side generation of passcodes by a token.

Illustrative embodiments of the present invention will be described herein with reference to exemplary communication systems and associated servers, clients and other processing devices. It is to be appreciated, however, that the invention is not restricted to use with the particular illustrative system and device configurations shown. Accordingly, the term "communication system" as used herein is intended to be broadly construed, so as to encompass, for example, systems in which multiple processing devices communicate with one another but not necessarily in a manner characterized by a client-server model.

As will be described, the present invention in one or more illustrative embodiments provides a recovery mechanism for split-server OTP verification systems. According to one aspect of the invention, a recovery mechanism is provided for a split-server verification system where different servers are responsible for verifying different portions (substrings) of the submitted passcode. According to another aspect of the invention, at least one of the servers and the relying party participate in the recovery effort. The disclosed recovery techniques improve the resilience against a temporary or permanent unavailability of one or more of the servers.

One-Time Authentication

One-time authentication tokens produce a series of unpredictable one-time passcodes (OTPs) as second authentication factors for the authentication of users to remote servers. Passcodes are typically generated on a regular time basis, i.e., in specified time intervals often called epochs (e.g., the SecurID™ token produces a new OTP every one minute). Passcodes are derived by using some secret state, called a seed, that is stored at the token and also shared with the server. Tokens can either be based on software or hardware. Software tokens produce passcodes on-demand, whenever the token's application is launched in the host device, where a series of passcodes is generated for the epochs following the launching of the application. Hardware tokens produce passcodes on a permanent basis, one passcode per epoch, for the entire lifetime of their battery (e.g., for five years from the time of manufacture). Overall, such tokens produce a time-based series of unpredictable OTPs by extracting pseudorandom bits from their seed which are converted to passcodes.

There are three main steps in the functionality of exemplary one-time authentication tokens:

1. A passcode $P_{t'}$ is produced in time epoch $t'$ through a one-way cryptographic function $f$ applied on the current epoch $t'$, and the seed $\sigma$ of the token. Software tokens specify their current epoch based on the host's device current time, whereas hardware tokens specify their epoch implicitly using a counter.

2. A passcode $P_{t'}$ may then be transmitted to an authentication server to authenticate a user to the server. The transmission of the passcode $P_{t'}$ to the server may happen either by typing performed by the user or automatically by a software token that is directly communicating to the server through a communication channel offered by the host device.

3. On receiving a candidate passcode $P_{t'}$, the server verifies this passcode by contrasting it against the passcode $P_t$ that is locally computed by the server, accepting the passcode if and only if $p_{t'}=P_t$. If the passcode is not accepted, the user is not authenticated; otherwise, the user is authenticated if and only if a user's corresponding PIN is correct. Passcode $P_t$ is computing by the server by applying the same function $f$ on the current epoch $t'$ specified by the server's current time and the seed $\sigma$ of the token stored at the server. To tolerate small discrepancies between the current time of the software (or hardware) token and the current time of the server, $P_{t'}$ is also contrasted against another 2s passcodes that are defined by epochs that are neighboring epochs to the server's epoch t, that is, to passcodes $\{P_{t-s}, \ldots, P_{t-1}, P_t, P_{t+1}, \ldots, P_{t+s}\}$.

Future passcodes remain unpredictable even if an attacker has observed an arbitrarily long history of passcodes produced in the past, because passcodes are produced by applying a one way function $f$ on the token's seed, as long as the seed remains secret, protected against leakage to an attacker.

Protections Against Seed Leakage

Accordingly, the security of any one-time authentication token is impaired if an attacker gets access to the secret seed of the token: Using the seed, the attacker can clone the token. In turn, the attacker can increase its chances for impersonating the corresponding user, by either performing a brute-force attack on the user's PIN or by launching a more sophisticated man-in-the-middle attack for harvesting the user's PIN. In reality, the fact that the security of the token is based on a secret seed will motivate the attacker to go after this secret seed by following one of the following three attack patterns:

1. Server Compromise: The attacker may compromise the authentication server and get the secret seed of the tokens of one or more users. The attacker may compromise the server ephemerally by instantly stealing the seed(s), or permanently by remaining in control of the server for a period of time.

2. Token Tampering or Compromise: The attacker may compromise the token and get its secret seed by performing a direct attack against the host device of a software token or by physically tampering with a hardware token to directly read its seed.

3. Seed-Record Capturing: The attacker may get the secret seed of the token indirectly by attacking a storage or communication unit used to store or transfer the token's seed, or through side-channel attacks performed against the token or the server.

Although conventional one-time authentication tokens are vulnerable to all such seed-leakage attacks, a general solution has been recently proposed in U.S. patent application Ser. No. 13/837,259, entitled "Configurable One-Time Authentication Tokens with Improved Resilience to Attacks," that involves the design of a configurable one-time authentication token which is equipped with several intrusion-detection, intrusion-resilience, tamper-resistance and token-visibility technologies that protect against the above attacks. The exemplary design optionally employs one or more of the following exemplary tamper-resistance and token-visibility techniques, as described in:

U.S. patent application Ser. No. 13/826,993, entitled "Time Synchronization Solutions for Forward-Secure One-Time Authentication Tokens;"

U.S. patent application Ser. No. 13/828,588, entitled "Randomizing State Transitions for One-Time Authentication Tokens;"

U.S. patent application Ser. No. 13/826,924, entitled "Event-Based Data-Signing Via Time-Based One-Time Authentication Passcodes," (now U.S. Pat. No. 9,225,717);

U.S. patent application Ser. No. 13/250,225, entitled "Key Update With Compromise Detection;"

U.S. patent application Ser. No. 13/728,271, entitled "Time Synchronisation & Forward Clock Attack," (now U.S. Pat. No. 9,083,515);

U.S. patent application Ser. No. 13/404,780, entitled "Method and Apparatus for Embedding Auxiliary Information in One-Time Passcode Authentication Tokens," (now U.S. Pat. No. 8,984,609);

U.S. patent application Ser. No. 13/404,788, entitled "Methods and Apparatus for Silent Alarm Channels Using One-Time Passcode Authentication Tokens;"

U.S. patent application Ser. No. 13/334,709, entitled "Methods and Apparatus for Generating Forward Secure Pseudorandom Numbers," (now U.S. Pat. No. 9,008,303); and U.S. patent application Ser. No. 13/404,737, entitled "Method and Apparatus for Authenticating a User Using Multi-Server One-Time Passcode Verification," (now U.S. Pat. No. 9,118,661).

Each of the above-referenced patent applications are incorporated by reference herein.

The exemplary design also employs one or more of the following exemplary intrusion-detection, and intrusion-resilience techniques. For a discussion of exemplary split-server passcode verification techniques, see, for example, U.S. patent application Ser. No. 13/404,737, entitled "Method and Apparatus for Authenticating a User Using Multi-Server One-Time Passcode Verification," (now U.S. Pat. No. 9,118, 661); U.S. patent application Ser. No. 13/795,801, entitled "Distributed Cryptography Using Distinct Value Sets Each Comprising At Least One Obscured Secret Value;" and U.S. patent application Ser. No. 14/144,707, entitled "Multi-Server One-Time Passcode Verification of Respective High Order and Low Order Passcode Portions," each incorporated by reference herein.

Split-Server Passcode Verification: This technique involves dispersing the task of verifying a candidate passcode (provided by a user or token) among two or more verification servers so that each such participating server $S_i$ stores only a partial secret state $\sigma_i$. Then, verification is securely implemented in a distributed manner so that leakage of one or more, but up to a specified threshold, partial secret states does not compromise the security of the token.

Typically, the seed is split into two pieces, often called the red and the blue partial seeds, stored separately by the red server and the blue server. Upon receiving a candidate passcode $P_t$, the two servers interact through a secure protocol to jointly compute the passcode $P_t$ against which the candidate passcode is contrasted, and accordingly $P_t$ is rejected if any of the two servers outputs "reject." This decision is typically made by a so-called relying party (RP) server that is stateless and responsible for the final decision about the acceptance of $P_t$, based on the individual outputs of the red and the blue servers.

The additional feature of proactivization can be used according to which the partial states of the (e.g., two) servers evolve over time and where the servers periodically exchange secure descriptions (e.g., hashes) of their partial secret states, which are then used to create their new partial secret states.

FIG. 1 illustrates an exemplary client-side generation of passcodes by a token 100. As shown in FIG. 1, the exemplary token 100 comprises a red and a blue FS-PRNG, $G_r$ and $G_b$, respectively, that produce protocodes $P_{R,t}$ and $P_{B,t}$, respectively, for each epoch t. Additionally, in the exemplary embodiment, the blue FS-PRNG $G_b$ produces pseudorandom information that is optionally used for an auxiliary channel (AC) 110 to embed additional information into the two produced protocodes, finally producing the transmitted passcode $P_t$.

Generally, $R_{AC,b}^t$ denotes the pseudorandomness derived by FS-PRNG $G_c$, c∈{b,r}, (in server B or R) for epoch t and that is used in the auxiliary channel 110.

The exemplary final exemplary passcode $P_t$ is computed using digit-wise modulo 10 addition of values $P_{R,t}$, $P_{B,t}$ and $c_t$, denoted here using operator $\oplus$ as $P_{R,t} \oplus P_{B,t} \oplus c_t$. In this manner, the final exemplary passcode $P_t$ optionally embeds the auxiliary information from the auxiliary channel 110. Thus, the final exemplary passcode $P_t$ can be referred to as an auxiliary-information enriched passcode.

Figure 2:
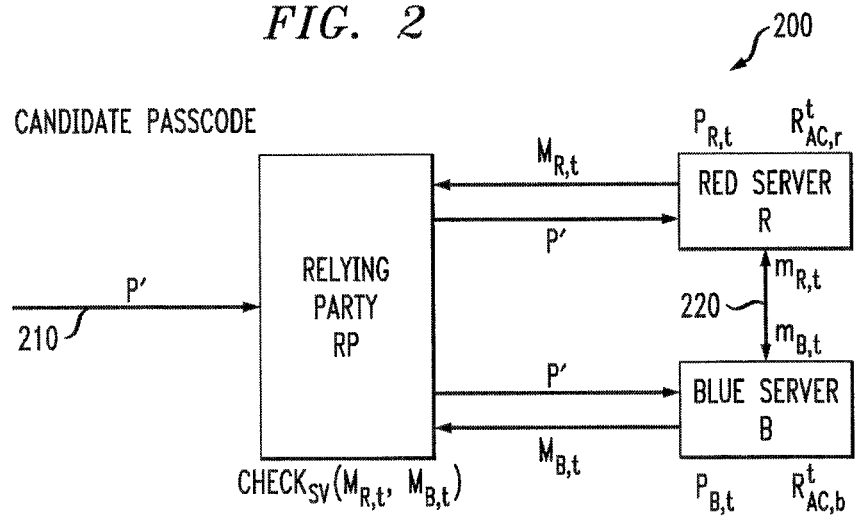
FIG. 2 illustrates an exemplary split-server passcode verification protocol.

FIG. 2 illustrates an exemplary split-server passcode verification protocol 200 (or simply split verification protocol) $\Pi_{SV}$, as in U.S. patent application Ser. No. 13/404,737, entitled "Method and Apparatus for Authenticating a User Using Multi-Server One-Time Passcode Verification;" U.S. patent application Ser. No. 13/795,801, entitled "Distributed Cryptography Using Distinct Value Sets Each Comprising At Least One Obscured Secret Value;" U.S. patent application Ser. No. 14/144,707, entitled "Multi-Server One-Time Passcode Verification of Respective High Order and Low Order Passcode Portions," and/or U.S. patent application Ser. No. 14/187,248, entitled "Security-Aware Split-Server Passcode Verification for One-Time Authentication Tokens," each incorporated by reference herein.

As shown in FIG. 2, the exemplary split-server passcode verification process 200 is initiated during step 210 when an auxiliary-information enriched candidate passcode P' is presented to a relying party RP.

(a) Using as additional local input the protocode $P_{B,t}$ and pseudorandomness $R_{AC,b}^t$, server B computes (intermediate) message $m_{B,t}$;

(b) Using as additional local input the protocode $P_{R,t}$ (and possibly pseudorandomness $R_{Ac,r}^t$, as in U.S. patent application Ser. No. 13/404,737, entitled "Method and Apparatus for Authenticating a User Using Multi-Server One-Time Passcode Verification," (now U.S. Pat. No. 9,118,661)), server R computes (intermediate) message $m_{R,t}$;

(c) Servers B and R exchange messages $m_{B,t}$ and $m_{R,t}$ during step 220 (possibly in multiple stateful interactions, e.g., when commitments are used as in U.S. patent application Ser. No. 13/404,737 (now U.S. Pat. No. 9,118,661));

(d) Servers B and R perform a final local computation and each outputs (final) message $M_{B,t}$ and respectively $M_{R,t}$;

(e) There exists a verification procedure $Check_{SV}$ which on input messages $M_{B,t}$ and $M_{R,t}$ outputs an auxiliary message aux and a boolean value accept or reject, written as (aux, {accept,reject})←$Check_{SV}(M_{B,t}, M_{R,t})$.

For the above execution of protocol $\Pi_{SV}$, $(M_{B,t}, M_{R,t}) \leftarrow \Pi_{SV}(t, P')$.

Example instantiation of $\Pi_{SV}$: A possible instantiation of the above abstract protocol may be implemented according to U.S. patent application Ser. No. 14/144,712, entitled "Multi-Server Passcode Verification for One-Time Authentication Tokens with Auxiliary Channel Compatibility," as follows. For a matrix A consisting of k rows of t-bit vectors, let $\overline{A}$ denote the high-order, left or most-significant half of the matrix consisting of k rows of $\lfloor t/2 \rfloor$ bits; and let $\underline{A}$ denote the low-order, right or least-significant half of the matrix A consisting of k rows of [t/2] bits. For instance, if A is [1234, 5678], then $\overline{A}$=[12,56] and $\underline{A}$=[34,78]. Then, server B uses pseudorandomness $R_{AC,b}{}^t$ and a binary codebook B to compute a digital codebook $C_t = \overline{C}_t \underline{C}_t$, and sets $m_{B,t} = \{\underline{C}_t, \underline{P}_{B,t}\}$. Server R sets $m_{R,t} = \overline{P}_{R,t}$. Then, server B sets $\overline{I}_t$ to $\emptyset$, computes $\overline{d}_t = \overline{P}' \ominus \overline{P}_{R,t} \ominus \overline{P}_{B,t}$, where $\ominus$ may denote the digit-wise modulo 10 subtraction operation, and for each $\overline{c}_j \in \overline{C}_t$, $1 \le j \le 2^k$, it checks if $\overline{c}_j = \overline{d}_t$ and if yes, then it sets $\overline{I}_t \leftarrow \overline{I}_t \cup j$; finally, B sets $M_{B,t} = \overline{I}_t$. Analogously, R sets $\underline{I}_t$ to $\emptyset$, computes $\underline{d}_t = \underline{P}' \ominus \underline{P}_{R,t} \ominus \underline{P}_{B,t}$, and for each $\underline{c}_j \in \underline{C}_t$, $1 \le j \le 2^k$, it checks if $\underline{c}_j = \underline{d}_t$ and if yes, then it sets $\underline{I}_t \leftarrow \underline{I}_t \cup j$; finally, R sets $M_{R,t} = \underline{I}_t$. Moreover, given $\overline{I}_t$ and $\underline{I}_t$, the verification procedure Check$_{SV}$ outputs mathsfaccept if and only if $\overline{I}_t \cap \underline{I}_t \ne \emptyset$, in which case it sets aux=$\overline{I}_t \cap \underline{I}_t$. Otherwise, it outputs ($\bot$,reject).

The relying party RP is typically responsible for handling the authentication request by a user and making the final accept/reject decision on this authentication attempt. Thus the relying party RP receives an incoming authentication attempt by some user and after communicating with the two servers needs to respond with an accept/reject decision. It is assumed that RP can only be compromised ephemerally; if RP would be compromised permanently then the entire authentication system would be compromised as the attacker could trivially make authentication decisions on any user authentication attempt. In contrast, the two servers can be compromised either ephemerally or permanently, in general.

It is assumed that the servers $S_B$ and $S_R$ communicate through a secure (i.e., authenticated and confidential) channel that is permanently available (this assumption comes without loss of generality, as a special TLS channel can be initiated and established as often as a protocol requires). It is also assumed, without loss of generality, a generic split-server passcode verification protocol that involves communication by RP to the servers $S_B$ and $S_R$ in Phase I, then communication between the two servers $S_B$ and $S_R$ in Phase II, followed by communication by the two server to RP in Phase III, as discussed above in conjunction with FIG. 2.

The split state of the system is optionally proactivized to evolve over time, possibly in a multiplexing way where the new blue state depends also on the old red state and vice versa.

Recovery Schemes

Server-Centric Recovery Scheme

An exemplary server-centric recovery scheme serves primarily as a temporary recovery method, capable of enabling the system to respond to authentication attempts even in the event of one of the two servers $S_B$ and $S_R$ being unavailable. Generally, the exemplary server-centric recovery scheme allows a periodic exchange of encrypted partial secret states among the two servers $S_B$ and $S_R$. In this case, recovery occurs by allowing the selective (and authorized and authenticated) decryption of the encrypted partial secret state that corresponds to the server that is unresponsive, referred to herein as the unresponsive server.

Figure 3:
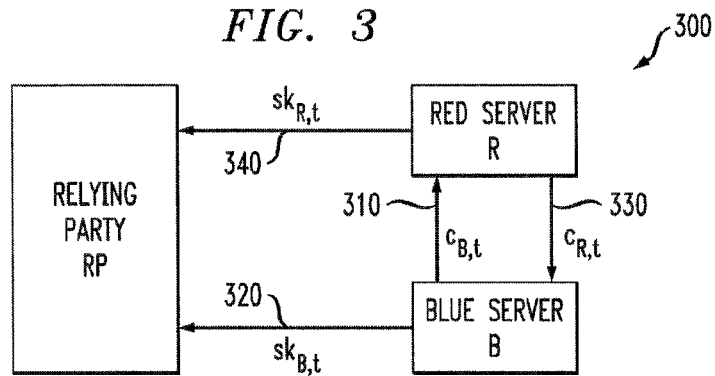
FIG. 3 illustrates an exemplary set-up phase for a server-centric recovery scheme for the exemplary split-server passcode verification of FIG. 2.

FIG. 3 illustrates an exemplary set-up phase 300 for a server-centric recovery scheme for the exemplary split-server passcode verification of FIG. 2. The exemplary system is parameterized with a recovery state update rate R $\ge$ 0 with which the two servers $S_B$ and $S_R$ securely exchange their partial secret states in an encrypted form. In one exemplary embodiment, a value R=0 indicates that no proactivization is in place. In particular, secret states are exchanged between the two servers $S_B$ and $S_R$ after being encrypted under a fresh independent master secret key that is unknown by the server receiving the encrypted state.

Specifically, every 1/R time units (e.g., seconds, minutes, days), at the beginning of time epoch t, the following process takes place:

(a) Server $S_B$ generates a fresh (new and independent) secret key sk$_{B,t}$ and encrypts its current local (partial) state $\sigma_{B,t}$ under sk$_{B,t}$ using semantically secure encryption scheme E to compute ciphertext $c_{B,t} = E_{sk_{B,t}}(\sigma_{B,t})$.

(b) Server $S_B$ sends $c_{B,t}$ to $S_R$ at step 310 and sk$_{B,t}$ to RP at step 320.

(c) Similarly, $S_R$ encrypts its state to $c_{R,t}$ under key sk$_{R,t}$ and sends $c_{R,t}$ to $S_B$ at step 330 and sk$_{R,t}$ to RP at step 340.

Figure 4:
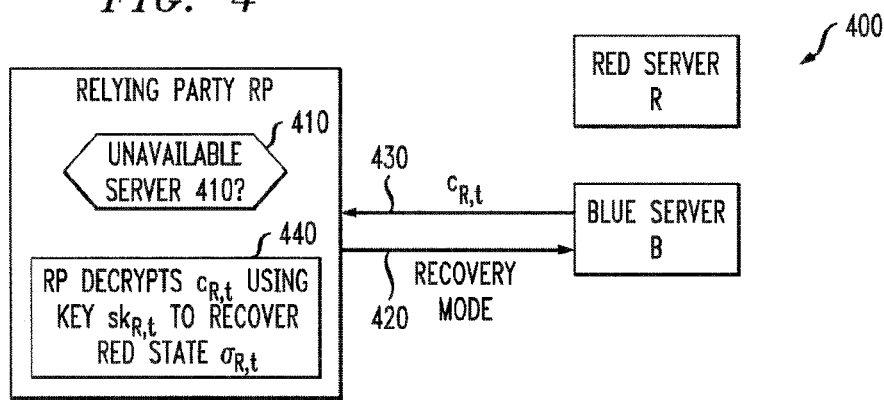
FIG. 4 illustrates an exemplary recovery phase for the server-centric recovery scheme of FIG. 3.

FIG. 4 illustrates an exemplary recovery phase 400 for a server-centric recovery scheme for the exemplary split-server passcode verification of FIG. 2. If during an authentication attempt by a user, RP discovers during step 410 that one of the two servers, say the red server $S_R$, is unavailable, then the following recovery process is executed.

The relying party RP notifies server $S_B$ during step 420 about the need for recovery of the missing red state and a reconstruction phase is initiated. During step 430, Server $S_B$ sends the encrypted red state $c_{R,t}$ to RP. During step 440, RP decrypts $c_{R,t}$ using key sk$_{R,t}$ to recover the red state $\sigma_{R,t}$. Thereafter, RP is placed into a special operational mode effectively replacing the red server $S_R$ for split-server passcode verification. In one exemplary embodiment, the server-centric recovery scheme of FIGS. 3 and 4 is an emergency only mode of operation which is reverted as soon as possible.

Thus, the RP server, jointly with the blue server $S_B$, completes the split-server passcode verification protocol of the current user authentication attempt, or any new incoming attempt while the red server is unavailable or until a new split-server can be initiated. Depending on policy, for example, a new server $S_R$ is orchestrated/installed or a backup S'$_R$ server is brought into action. Then, RP leaves the special emergency state and returns to a normal operational mode.

Alternatively, the keys sk$_{B,t}$, sk$_{R,t}$ can be generated by RP; in this mode of operation, the blue (or red) server sends its state to RP (over a secure channel) and RP encrypts the blue and/or red state under a fresh encryption key, finally sending the encrypted blue state to the red server and vice versa.

In case the system is proactivized to periodically change states, in a multiplexing way, the above periodic set-up phase can be performed simultaneously to the proactivization process.

The detection of the need to initiate the recovery process can be alternatively performed by the surviving server, such as the blue server; for instance, via their direct communication channel, the two servers, red and blue, can periodically exchange "aliveness" reports and, in case the red server fails to report at a given epoch, the blue server may immediately notify RP to have the recovery phase initiated. These periodic aliveness acknowledgements may happen with a frequency that overlaps with the one of the recovery state update period.

More than one mode of recovery may be supported. In the two-server recovery mode, described above, RP replaces the malfunctioning (red) server. In a one-server recovery mode, the server $S_B$ may play the role of $S_R$, effectively (temporarily) inactivating the split-server feature from the OTP system.

It is possible that any new, fresh secret key that is produced by RP or the red or blue server also depends on the current red or blue seed or any combination of those, e.g., by considering XORing of any such current seed state with new, fresh pseudo-randomness. $S_B$ may play the role of $S_R$, effectively (temporarily) inactivating the split-server feature from the OTP system.

Token-Centric Recovery Scheme

Figure 5:
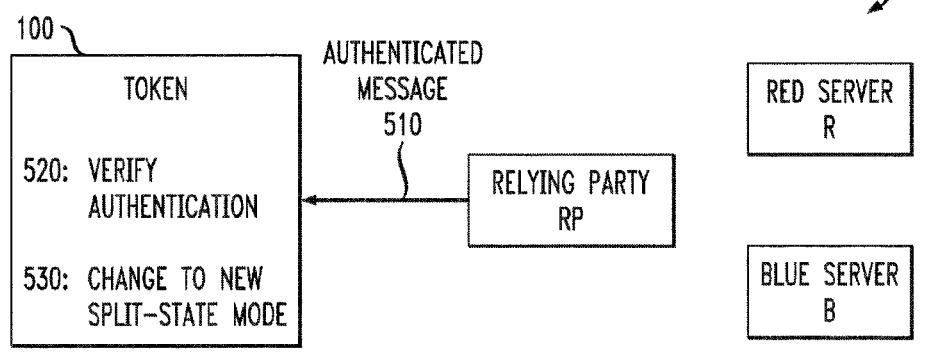
FIG. 5 illustrates an exemplary alternative token-centric recovery scheme for the exemplary split-server passcode verification of FIG. 2.

FIG. 5 illustrates an exemplary alternative token-centric recovery scheme 500 for the exemplary split-server passcode verification of FIG. 2. The exemplary token-centric recovery scheme 500 of FIG. 5 is more permanent than the exemplary server-centric recovery scheme discussed above in conjunction with FIGS. 3 and 4, in the sense that the token-centric recovery scheme changes the split-state configuration of the system for a potentially long period of time. The exemplary token-centric recovery scheme operates under the assumption that there is a secure unidirectional communication channel from RP to the token 100 (discussed above in conjunction with FIG. 1). This is a realistic assumption in many settings, e.g., in hardware tokens that have USB input or in software tokens that operate in a connected mode.

Under certain conditions being met (described, for example, by a policy), RP may send a request 510 to the token 100 for a change of the split-state mode of operation of the token 100. All possible changes can be supported. For example, the token 100 can change from a red-blue state (i.e., where the token 100 produces passcodes of the form $P_t = P_{B,t} \oplus P_{R,t}(\oplus c_t)$), to an only-red state or an only-blue state (i.e., the token 100 produces passcodes of the form $P_t = P_{B,t}(\oplus c_t)$ or $P_t = P_{R,t}(\oplus c_t)$), or vice versa.

Even if a secure communication channel between RP and the token 100 is assumed, aspects of the present invention recognize that it is important that an additional authentication mechanism is applied to the communication 510 requesting a change in the split-state mode of the token 100. For example, the relying party RP may "sign" such change-of-mode requests using the next passcode of the new (requested) state. For instance, if a request 510 is for a change from the red-blue state to an only-blue state, RP may provide the next blue passcode of the form $P_t = P_{B,t}(\oplus c_t^*)$ where $c_t^*$ is a special auxiliary-channel codeword indicating this specific change of mode request, and where t is the next time epoch from the current time epoch t−1. The token 100 (or a corresponding client) verifies the authentication applied to the message 510 during step 520. The client performs the requested change during step 530 only after successfully verifying the next passcode $(P_t = P_{B,t}(\oplus c_t^*))$ in the request 510.

It is noted that the token-centric recovery scheme 500 can operate in a synergetic way with the server-centric recovery scheme discussed above in conjunction with FIGS. 3 and 4. For example, the split-state mode of the token 100 may change to an only-blue mode in response to a detected failure of the red server $S_R$ (as part of the reaction to a detected failure). Note that, in this case, the signature next blue passcode is known to RP.

CONCLUSION

The foregoing applications and associated embodiments should be considered as illustrative only, and numerous other embodiments can be configured using the techniques disclosed herein, in a wide variety of different cryptography applications.

For example, both the split server and the auxiliary-channel handling methods described herein can be extended in the case of more than two servers, assuming a token-side design that supports such extensions. For instance, if a passcode comprises of three protocode parts, say red, blue and green, then vertical splitting can be considered into three corresponding parts. Splitting into more parts than the number of protocodes is also possible if the appropriate pseudorandom information is appropriately disseminated among the servers. Similarly, auxiliary-channel handling can be supported in multi-server settings.

It should also be understood that split-server verification, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The embodiments described herein can provide a number of significant advantages relative to conventional practice. For example, these embodiments can advantageously provide improved scalability and support of auxiliary channels. Also, a wide variety of different OTP verification protocols can be implemented using the disclosed techniques.

Authentication processes in other embodiments may make use of one or more operations commonly used in the context of conventional authentication processes. Examples of conventional authentication processes are disclosed in A. J. Menezes et al., Handbook of Applied Cryptography, CRC Press, 1997, which is incorporated by reference herein. These conventional processes, being well known to those skilled in the art, will not be described in further detail herein, although embodiments of the present invention may incorporate aspects of such processes.

The communication system may be implemented using one or more processing platforms. One or more of the processing modules or other components may therefore each run on a computer, storage device or other processing platform element. A given such element may be viewed as an example of what is more generally referred to herein as a "processing device."

Figure 6:
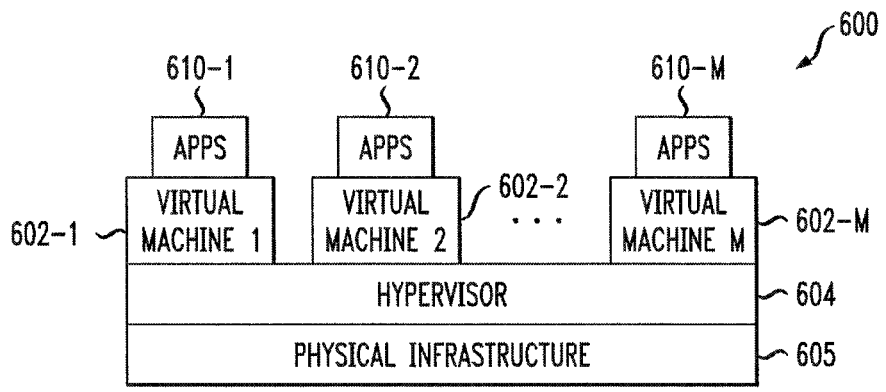
FIG. 6 illustrates an exemplary processing platform that may be used to implement at least a portion of one or more embodiments of the invention comprising a cloud infrastructure.

Referring now to FIG. 6, one possible processing platform that may be used to implement at least a portion of one or more embodiments of the invention comprises cloud infrastructure 600. The cloud infrastructure 600 in this exemplary processing platform comprises virtual machines (VMs) 602-1, 602-2, . . . 602-M implemented using a hypervisor 604. The hypervisor 604 runs on physical infrastructure 605. The cloud infrastructure 600 further comprises sets of applications 610-1, 610-2, . . . 610-M running on respective ones of the virtual machines 602-1, 602-2, . . . 602-M under the control of the hypervisor 604.

The cloud infrastructure 600 may encompass the entire given system or only portions of that given system, such as one or more of client, servers, controller, authentication server or relying server in the system.

Although only a single hypervisor 604 is shown in the embodiment of FIG. 6, the system may of course include multiple hypervisors each providing a set of virtual machines using at least one underlying physical machine.

An example of a commercially available hypervisor platform that may be used to implement hypervisor 604 and possibly other portions of the system in one or more embodiments of the invention is the VMware® vSphere™ which may have an associated virtual infrastructure management system, such as the VMware® vCenter™. The underlying physical machines may comprise one or more distributed processing platforms that include storage products, such as VNX and Symmetrix VMAX, both commercially available from EMC Corporation of Hopkinton, Mass. A variety of other storage products may be utilized to implement at least a portion of the system.

Figure 7:
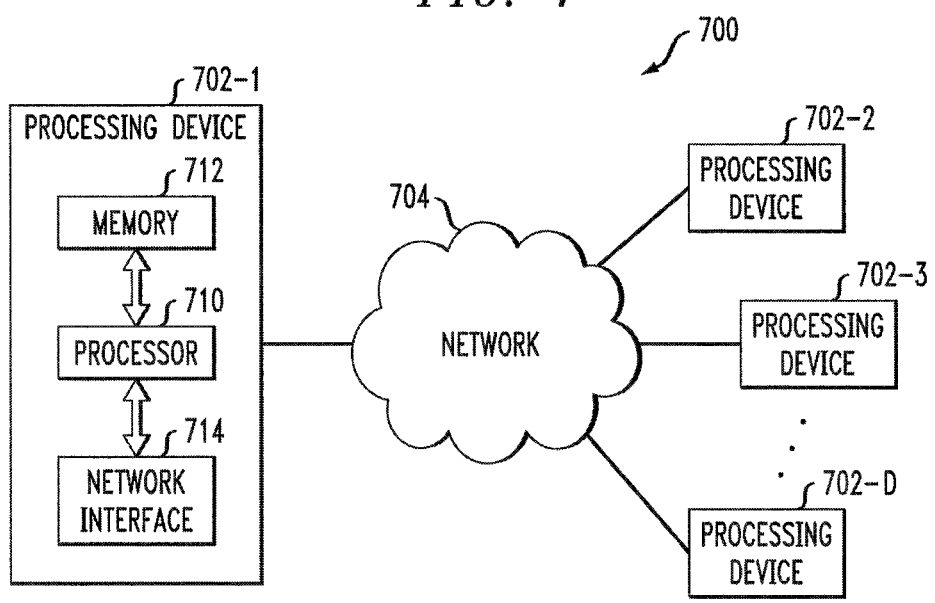
FIG. 7 illustrates another exemplary processing platform that may be used to implement at least a portion of one or more embodiments of the invention.

Another example of a processing platform is processing platform 700 shown in FIG. 7. The processing platform 700 in this embodiment comprises at least a portion of the given system and includes a plurality of processing devices, denoted 702-1, 702-2, 702-3, . . . 702-D, which communicate with one another over a network 704. The network 704 may comprise any type of network, such as a WAN, a LAN, a satellite network, a telephone or cable network, a cellular network, a wireless network such as WiFi or WiMAX, or various portions or combinations of these and other types of networks.

The processing device 702-1 in the processing platform 700 comprises a processor 710 coupled to a memory 712. The processor 710 may comprise a microprocessor, a microcontroller, an ASIC, an FPGA or other type of processing circuitry, as well as portions or combinations of such circuitry elements, and the memory 712, which may be viewed as an example of a "computer program product" having executable computer program code embodied therein, may comprise RAM, ROM or other types of memory, in any combination.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and the given system may include additional or alternative processing platforms, as well as numerous distinct processing platforms in any combination, with each such platform comprising one or more computers, storage devices or other processing devices.

Multiple elements of system may be collectively implemented on a common processing platform of the type shown in FIG. 6 or 7, or each such element may be implemented on a separate processing platform.

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a tangible recordable medium (e.g., floppy disks, hard drives, compact disks, memory cards, semiconductor devices, chips, application specific integrated circuits (ASICs)) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

It should again be emphasized that the above-described embodiments of the invention are presented for purposes of illustration only. Many variations and other alternative embodiments may be used. For example, the techniques are applicable to a wide variety of other types of cryptographic devices and authentication systems that can benefit from distributed cryptography using distinct value sets as disclosed herein. Also, the particular configuration of communication system and processing device elements shown herein, and the associated authentication techniques, can be varied in other embodiments. Moreover, the various simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A recovery method for a split-server passcode verification system comprising a plurality of authentication servers, said recovery method comprising:
    determining that a first one of said plurality of authentication servers is unavailable;
    instructing a second one of said plurality of authentication servers to enter a recovery mode based on the determination that the first one of said plurality of authentication servers is unavailable, wherein prior to said first authentication server becoming unavailable, at least one of said first and second authentication servers provide a respective secret key used to protect a partial secret state to a relying party and said second authentication server receives an encrypted version of said respective partial secret state of said first authentication server;
    obtaining said encrypted partial secret state of said first authentication server from said second authentication server;
    decrypting said received said encrypted partial secret state of said first authentication server to recover said partial secret state of said first authentication server; and
    employing said recovered partial secret state of said first authentication server to perform a split-server passcode verification of at least one user with said second authentication server.

2. The method of claim 1, wherein said step of employing said recovered partial secret state of said first authentication server to perform said split-server passcode verification is performed until one or more of said first authentication server is available and a replacement authentication server is initiated.

3. The method of claim 1, wherein said first and second authentication servers exchange an encrypted version of said respective partial secret stat.

4. The method of claim 1, further comprising the steps of generating secret keys $sk_{B,t}$, $sk_{R,t}$ for said first and second authentication servers, respectively; obtaining a respective partial secret state $\sigma_{B,t}$, $\sigma_{R,t}$ from said first and second authentication servers, respectively; encrypting said respective partial secret states $\sigma_{B,t}$, $\sigma_{R,t}$ using at least one encryption key; and providing each of said encrypted versions $c_{B,t}$, $c_{R,t}$ of said respective partial secret state $\sigma_{B,t}$, $\sigma_{R,t}$ to the other of said authentication servers.

5. The method of claim 1, wherein said at least one of said first and second authentication servers provide a respective secret key used to protect a partial secret state to a relying party and said second authentication server receives an encrypted version of said respective partial secret state of said first authentication server substantially simultaneously with a proactivization process.

6. The method of claim 1, wherein said first and second authentication servers provide an "aliveness" message to at least one other server.

7. The method of claim 1, wherein each of said encrypted partial secret states is encrypted under an independent master secret key unknown to said authentication server receiving said encrypted partial secret state.

8. The method of claim 1, wherein said second authentication server receives an encrypted version of said respective partial secret state of said first authentication server at a recovery state update rate.

9. An apparatus in a split-server passcode verification system comprising a plurality of authentication servers, comprising:
   a memory; and
   at least one hardware device, coupled to the memory, operative to implement the following steps:
   determining that a first one of said plurality of authentication servers is unavailable;
   instructing a second one of said plurality of authentication servers to enter a recovery mode based on the determination that the first one of said plurality of authentication servers is unavailable, wherein prior to said first authentication server becoming unavailable, at least one of said first and second authentication servers provide a respective secret key used to protect a partial secret state to a relying party and said second authentication server receives an encrypted version of said respective partial secret state of said first authentication server;
   obtaining said encrypted partial secret state of said first authentication server from said second authentication server;
   decrypting said received said encrypted partial secret state of said first authentication server to recover said partial secret state of said first authentication server; and
   employing said recovered partial secret state of said first authentication server to perform a split-server passcode verification of at least one user with said second authentication server.

10. The apparatus of claim 9 wherein said step of employing said recovered partial secret state of said first authentication server to perform said split-server passcode verification is performed until one or more of said first authentication server is available and a replacement authentication server is initiated.

11. The apparatus of claim 9 wherein said first and second authentication servers exchange an encrypted version of said respective partial secret state.

12. The apparatus of claim 9, wherein said at least one hardware device is further configured to implement the steps of generating secret keys $sk_{B,t}$, $sk_{R,t}$ for said first and second authentication servers, respectively; obtaining a respective partial secret state $\sigma_{B,t}$, $\sigma_{R,t}$ from said first and second authentication servers, respectively; encrypting said respective partial secret states $\sigma_{B,t}$, $\sigma_{R,t}$ using at least one encryption key; and providing each of said encrypted versions $C_{B,t}$, $c_{R,t}$ of said respective partial secret state σB,t, σR,t to the other of said authentication servers.

13. The apparatus of claim 9, wherein said at least one of said first and second authentication servers provide a respective secret key used to protect a partial secret state to a relying party and said second authentication server receives an encrypted version of said respective partial secret state of said first authentication server substantially simultaneously with a proactivization process.

14. The apparatus of claim 9, wherein said first and second authentication servers provide an "aliveness" message to at least one other server.

15. The apparatus of claim 9, wherein each of said encrypted partial secret states is encrypted under an independent master secret key unknown to said authentication server receiving said encrypted partial secret state.

16. The apparatus of claim 9, wherein said second authentication server receives an encrypted version of said respective partial secret state of said first authentication server at a recovery state update rate.

* * * * *